United States Patent
Espie et al.

(10) Patent No.: US 6,206,336 B1
(45) Date of Patent: Mar. 27, 2001

(54) VENTING OF MOLDS

(75) Inventors: Jacques Espie, Pont-du-Chateau; Daniel Labarre, Clermont-Ferrand; Maurice Rey, Cebazat, all of (FR)

(73) Assignee: Compagnie Generale des Etablissements Michelin - Michelin & Cie, Clermont-Ferrand Cedex (FR)

( * ) Notice: Subject to any disclaimer, the term of this patent is extended or adjusted under 35 U.S.C. 154(b) by 590 days.

(21) Appl. No.: 08/540,947

(22) Filed: Oct. 11, 1995

(30) Foreign Application Priority Data

Oct. 20, 1994 (FR) .................................................. 94 12654

(51) Int. Cl.⁷ .................................................. B29C 33/10
(52) U.S. Cl. ........................ 249/141; 425/28.1; 425/812
(58) Field of Search ........................ 249/141; 425/28.1, 425/546, 812

(56) References Cited

U.S. PATENT DOCUMENTS

| 3,474,498 | 10/1969 | Hoppes | 425/190 |
|---|---|---|---|
| 3,822,857 | 7/1974 | Tanie | 249/141 |
| 3,854,852 * | 12/1974 | Carter | 425/812 |
| 4,347,212 * | 8/1982 | Carter | 425/812 |
| 4,436,497 * | 3/1984 | Dahl et al. | 425/812 |
| 4,447,197 * | 5/1984 | Bartley et al. | 425/812 |
| 4,492,554 * | 1/1985 | Carter | 425/812 |
| 4,740,145 * | 4/1988 | Shurman | 425/812 |
| 4,795,331 * | 1/1989 | Cain et al. | 425/812 |
| 5,234,326 | 8/1993 | Galli et al. | 425/46 |
| 5,283,022 * | 2/1994 | Bartley | 425/812 |
| 5,382,402 * | 1/1995 | Espie et al. | 425/812 |

FOREIGN PATENT DOCUMENTS

| A1965121 | 7/1971 | (DE) . |
| A1394552 | 7/1965 | (FR) . |

OTHER PUBLICATIONS

Patent Abstracts of Japan, vol. 011 No. 102 (M–576) Mar. 31, 1987 & JP–A–61 252109 (Bridgestone Corp) Nov. 10, 1986.

* cited by examiner

*Primary Examiner*—James P. Mackey
(74) *Attorney, Agent, or Firm*—Baker Botts L.L.P.

(57) ABSTRACT

A mold shell having a hole which extends from the molding surface through said shell up to the outside of said mold. The hole is closed by a plug having a completely air-tight end face which is flush with the molding surface so as to constitute a portion of the molding surface, said plug occupying all of the surface of said hole in the molding surface.

4 Claims, 2 Drawing Sheets

VENTING OF MOLDS

BACKGROUND OF THE INVENTION

The present invention relates to molds, particularly for the molding of tires, and in particular to venting techniques used in these molds in order to permit the air imprisoned between the mold and a raw tire blank to escape to the outside.

Molds for tires are frequently equipped with a number of vents arranged at suitable places. These vents are, for instance, generally holes of small diameter connecting the inner cavity of the mold with the outside of the mold. As it is not possible to produce holes of extremely small diameter due to inherent limitations in the machining techniques, it results that the diameter of these holes is generally sufficient to permit rubber to flow, at least slightly, into said holes when the tire is molded. This is the reason why small burrs of rubber protruding slightly from the outer surface can be noted on the surface of numerous tires.

It has been attempted to reduce the dimensions of the vents to a size which is sufficiently small to prevent the raw rubber from flowing into the vent spaces while permitting the air to escape to the outside of the mold. In order to reduce the diameter of the vents beyond what it is possible to do by techniques of direct drilling on the mold, it has been proposed to pierce a hole of relatively large diameter in the mold and to insert into said hole a vent which, in its turn, has a hole or slit or space of extremely reduced size. By way of example, reference may be had to U.S. Pat. No. 4,447,197 which describes a vent of this type. Another example is described in U.S. Pat. No. 3,854,852, in which there can be noted a vent of "valve" type which closes at the time that the raw rubber comes into contact with the head of the valve, after having allowed the air imprisoned between the raw rubber and the mold to escape.

The vents known from the prior art have numerous drawbacks. While some of them permit the air to escape while effectively preventing the appearance of molding burrs on the vulcanized tire, their satisfactory operating life remains, in general, very short. This makes it necessary to repair the mold far too frequently. It is therefore necessary to remove it regularly from the vulcanization press and shut the press down for the time necessary for the repair operations. Furthermore, it is not always possible to restore the venting capacity of these vents, and they must therefore be replaced rather regularly. This leads to an increase in the industrial cost price of these venting techniques. Furthermore, in the case of vents of the valve type, the initial cost price of such vents is relatively high.

With regard to the tread of tires, recourse is had to different means of venting, namely the implanting of vents such as described above, the production of simple drillings, or else one also makes use of the slits which are present between the different parts of the mold (planes of joints between parts) in order to conduct the air from the inside of the molding cavity to the outside of the mold. If necessary, the places where the planes of joints between the different parts of the mold are judiciously selected with respect to the tread pattern of the tire so that, whenever possible, a slit is present at the place where it is necessary to vent the mold.

By way of illustration of this last-mentioned technique, reference may be had to U.S. Pat. No. 5,234,326. In that case, for certain tread patterns, it is possible to develop a complete venting of the tire mold which does not require the drilling of vents. In the case of other tire patterns, however, it is not possible to achieve this purpose. Therefore, even in the tread portion of a tire mold, it is not always possible to avoid having recourse to drillings or vents.

A molding of better and better quality is always desired. The molding burrs which appear on the surface of the tire, whether in the form of small strips or of small bits, are harmful even in the event that the amount of rubber which has flowed out remains very small, since the appearance of the tire is such that the quality perceived by the buyer is considered poor.

Therefore, the problem is always present of succeeding in organizing a complete venting of a tire mold and of succeeding in doing so by dependable means, that is to say means which require only very little maintenance in industrial operation. The problem also arises of designing a less expensive venting, the maintenance of which is as simple as possible, in order that it can be adopted very easily by tire manufacturing workshops without the need of sending the mold back to a mold-construction workshop for it to undergo renovation there.

SUMMARY OF PRESENT INVENTION

The present invention proposes a mold which has a molding cavity which is limited by molding walls made of one or more materials, each molding wall having an air-tight molding surface defining a portion of the form of the outer surface of the object to be molded, characterized by the fact that at least one wall comprises at least one hole extending from said surface through said wall in order to place the molding cavity in communication with the outside of said mold, said hole being closed by a plug having an entirely tight end face flush with said surface in order to constitute a portion of the molding surface, said plug taking up exactly the entire surface of said hole in said molding surface.

The solution proposed by this invention makes it possible to produce only a venting with a relatively slight rate of flow of air. For this reason, it is in general used together with other venting techniques, making use of the slits present between the different mold parts or else, with respect in particular to the sidewalls of the mold, a technique such as described in U.S. Pat. No. 5,382,402. The technique proposed by the invention, despite its slight rate of flow, proves, however, entirely of interest for the perfecting of the venting, in particular in the case of tires having special tread patterns, or in all cases for the tires, in certain regions of the sidewall or the bead, where great difficulties in venting were encountered in the past.

Contrary to the numerous attempts which can be noted, in particular, from the patent references, the present invention does not propose producing a vent of very sophisticated form, nor does it propose producing a vent having movable parts nor using porous materials. Although the clearance between the plug and the hole which receives it is theoretically zero, it has been found experimentally that the air can leak around the plug at the temperature and pressure levels reached during molding. The dimensioning of the plug as venting means proposed is extremely simple, and the venting remains easy to achieve, even in a less specialized workshop, such as a tire production unit, in order to obtain venting spaces where desired.

Very unexpectedly, it is not necessary to try to provide an air-escape hole of very small dimensions at the level of the molding surface of the mold. While all vents known in the prior art allow holes or slits to appear physically on the molding surface, the present invention proposed using a sort of vent which could almost be termed "blind", if it were not for its experimentally noted ability to allow air to escape. It has been possible to note that, even when effecting a force-fitting between the plug and the hole which receives it, the mounting of the plug in the hole does not take place in an infinitely air-tight manner. There results from this a leakage flow which can contribute to a very great extent to the venting of the mold, since the role played by these vents falls primarily within the so-called final molding regions, which at times are extremely difficult to vent.

Of course, the hole which appears on the surface of the mold is of any shape whatsoever. The simplest is to produce a circular hole with a drill. A drilling diameter which is suitable for production is between 2 and 3 mm. Thus, the trace of the plug appearing on the molding surface of the wall of the mold is less than a value of about 10 mm². This area is preferably less than 100 mm².

The invention also proposes a method of producing venting on a mold, said mold having a molding cavity defined by walls each having a molding surface, said walls being made of one or more materials, comprising the following steps:

producing, in at least one wall, at least one hole which extends from the surface of said wall through said wall to the outside of said mold, inserting into said hole, from the side of said molding surface, a plug which, once inserted, takes up precisely all of the area of the hole, at least at the level of said surface of the wall, is locked by clamping within said hole, and protrudes at least slightly with respect to said surface, leveling said plug to the level of said surface.

DESCRIPTION OF DRAWINGS

The following figures illustrate one embodiment of the invention in which use is made of a plug of plastic material, embedded in a tire mold made of cast aluminum or steel. One plastic material which is suitable for this plug is PPS (phenylene polysulfide), filled with 30% by weight carbon fiber, or else PEEK (polyether-ether ketone), filled in the same manner. This example is, of course, not limitative. It makes it possible to use two materials of very different hardnesses.

DESCRIPTION OF PREFERRED EMBODIMENTS

Figure 1:
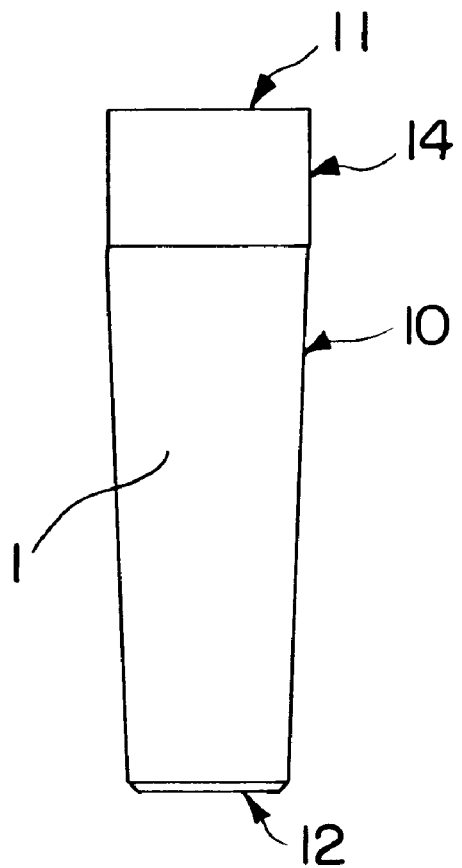
FIG. 1 is a view in elevation of a first embodiment of a plug in accordance with the invention.
Figure 3:
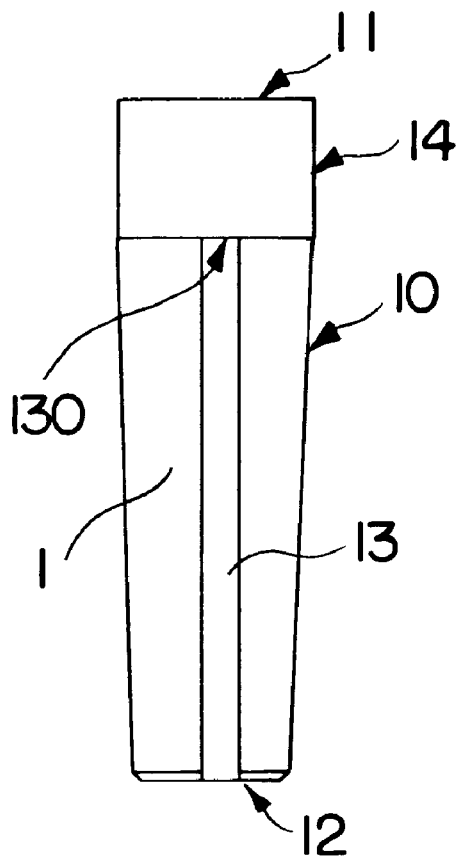
FIG. 3 is a view in elevation of a second embodiment of a plug in accordance with the invention.
Figure 2:
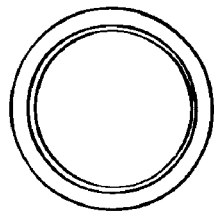
FIG. 2 is an end view of this same plug.
Figure 4:
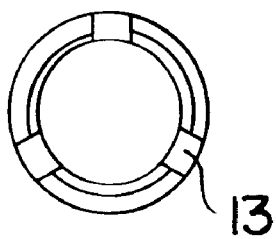
FIG. 4 is an end view of the second.

The plug 1 of the invention has the shape of an elongated rod or pin (see FIGS. 1 to 4). The plug has a side surface 10 and at least one end surface 11 and an opposite end 12. The exact shape of this opposite end 12 is not critical; it may be a tapered point or a flat surface, as shown in the drawings. On the side surface 10 it is possible to provide grooves 13 which start at said opposite end 12 and terminate at a distance spaced from said end face 11, as shown in FIG. 3.

These grooves are intended to facilitate the passage of air to the outside of the mold.

Such plugs can very easily be provided by molding a plastic material. In accordance with one aspect of the present invention, the grooves 13, when they are present, do not extend to the molding surface of the walls of the tire mold. They therefore do not extend to the end surface 11. A ring 14, having a uniform, non-grooved surface, which is, for instance, cylindrical or slightly frustoconical, remains. As can be clearly noted from FIGS. 3 and 4, said side surface 10, which is at least partially frustoconical, is such that the cross section of said plug 1 decreases in the direction towards the side where said grooves 13 extend to the opposite end 12.

Figure 5:
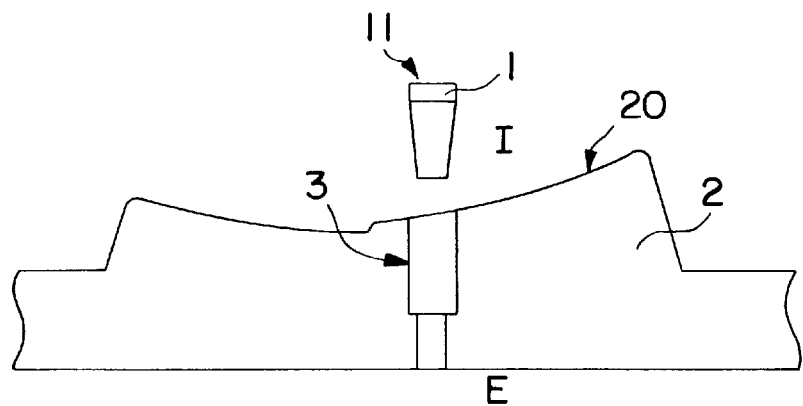
FIG. 5 shows, in radial section, a shell of a tire mold having a hole in front of which there is presented a plug in accordance with the invention.

The vent of the invention is therefore embodied by a simple insert mounted in a hole made on the mold in the manner explained below. In FIG. 5 there can be noted one of the conventional parts constituting a tire mold, namely a shell 2 intended to mold one of the sidewalls of the tire. The inner surface 20 of said shell 2 constitutes an exact image of the outer surface of the sidewall of the tire which it is desired to mold. At all the desired places, a hole such as 3 is drilled through said shell 2. It therefore makes it possible to place the interior molding cavity I in communication with the exterior E of the mold. The hole 3 and the plug 1 are designed so as to present, for instance, an H7/m6 fitting.

Figure 6:
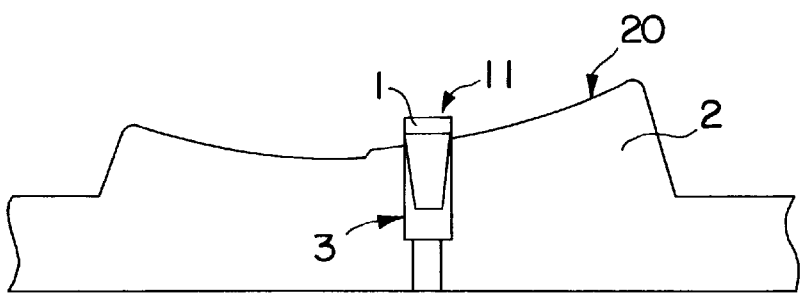
FIG. 6 shows this same plug inserted slightly into the hole.
Figure 7:
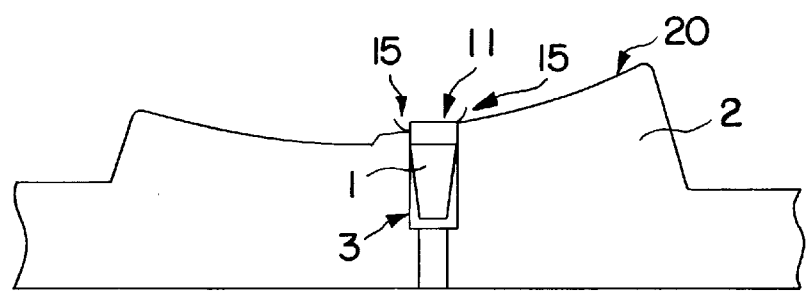
FIG. 7 shows this same plug embedded in the shell.
Figure 8:
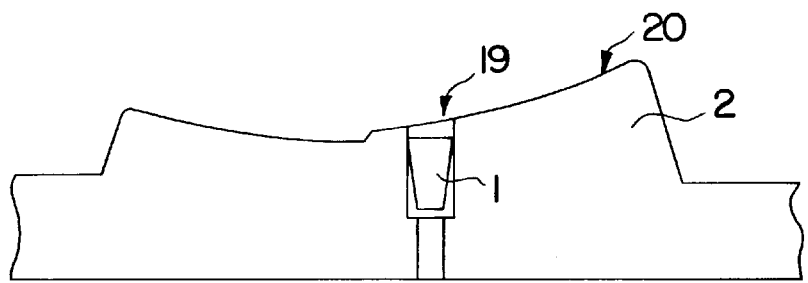
FIG. 8 shows the mold equipped with its vent, ready to be used in order to mold a tire.

The next step consists in inserting the plug 1 in the hole 3, preferably from the side on which the molding surface 20 is located (see FIGS. 5 and 6), until the side face 11 arrives practically at the level of the molding surface 20 of the shell 2 (see FIG. 7). of course, if the plug 1 has grooves 13, it is necessary that the end 130 of these grooves be inserted to the inside of the thickness of the shell 2 in order that these grooves do not extend to the level of the molding surface 20. In view of the fittings provided, there is no operating clearance between the plug 1 and the shell 2. Due to the fact that the hardness of the plastic material is definitely less than the hardness of the metallic material constituting the shell 2, when the plug 1 is embedded within the hole 3, the metallic material effects a slight machining of the side surface 10 of the plug 1. This causes the appearance of small chips such as 15 which remain on the side of the inner cavity of the mold. The final step for the building of a vent consists in leveling the plug 1 by means of a cutting tool in order to produce a molding surface 19 which is located exactly, in its entirety, along the extension of the molding surface 20 of the wall which surrounds the plug 1 (FIG. 8).

The mold which is thus obtained therefore has a plug 1 made of a material the hardness of which is definitely less than the hardness of the material essentially constituting the said wall 2, said plug 1 having, prior to mounting, a cross section circumscribed in the cross section of the said hole 3, at least on the side intended to be flush with said molding surface, said plug 1 being force-fitted in said hole 3. In the final step, the said end face 11 of said plug 1, possibly after leveling in order to form a molding surface 19, is located completely along the extension of the molding surface 20 of the wall 2 bordering said hole 3.

Of course, on basis of the present description, many variations and adaptations would be apparent to a person skilled in the art. The fittings cited are by way of example. It is sufficient in order to prevent the flow of rubber causing burrs that the plug 1 remains fixed firmly on the inside of the molding wall. It is necessary, of course, that the pressure of the raw rubber which acts on the molding surface 11 does not make it possible to drive the plug 1 further into the hole 3.

The propensity towards crushing of vents designed in this manner is far less than that which could be noted in the case of slit-shaped vents or in the case of holes of extremely small diameter. However, it is possible that in the long run a loss of effectiveness of the venting produced will be noted. In such case, the renewal operation is extremely simple and inexpensive. It is sufficient, by the use of a punch of a suitable diameter less than the diameter of the hole 3 which can be inserted in the hole 3 from the outside E of the mold to remove the plug 1 from the hole 3 and replace it with a new plug.

The vent proposed by the present invention does not have any moving parts. It does not rely on any deformation or internal flexibility in order to permit the venting. If the materials used for this plug have a hardness which is very much less than the hardness of the material constituting the mold, it is possible to use force-fittings without it being necessary to respect a narrow tolerance for the molding of the plug 1. It is possible to use plastic materials without it being possible to detect harmful influences due to the smaller thermal conductivity of the plugs as compared with the molding wall. The state of vulcanization of the rubber molded by means of a mold equipped in this manner is entirely comparable to that which is obtained with molds equipped with metal vents or mold not equipped with a venting vent.

The present invention, used with other venting techniques of greater rate of flow, makes it possible to obtain the necessary venting in all the final molding places which present a greater difficulty in venting. It contributes to producing a mold which permits the molding of a tire which has no defect in appearance. Its industrial use proves extremely reliable.

We claim:

1. A mold comprising a molding cavity defined by molding walls made of one or more materials, each molding wall having an air-tight molding surface defining a portion of the shape of the outer surface of the object to be molded, a mold venting means venting the mold cavity and a supplementary venting means venting the mold cavity at a lesser rate of flow than the mold venting means at the molding temperature and pressure, said supplementary venting means including at least one hole extending from said molding surface through a molding wall so as to place the molding cavity in communication with the outside of said mold, and a plug filling and closing the hole on insertion of the plug in the hole and having an air-tight end face flush with said molding surface so as to constitute a portion of the molding surface, said plug on insertion occupying precisely the entire surface of said hole in said molding surface, the plug being made of a material the hardness of which is substantially less than the hardness of the material surrounding the hole, the plug having, before mounting in the hole, a cross section circumscribed in the cross section of the hole on at least the face intended to be flush with the molding surface, the plug being force-fitted in the hole.

2. A mold according to claim 1 in which the area of the end face of the plug is less than 100 mm$^2$.

3. A mold according to claim 2, in which the area of the end face of the plug is less than 10 mm$^2$.

4. A mold according to claim 1 in which the molding walls are made of metallic material and the plug is made of plastic material.

* * * * *

UNITED STATES PATENT AND TRADEMARK OFFICE
CERTIFICATE OF CORRECTION

PATENT NO. : 6,206,336 B1
DATED : March 27, 2001
INVENTOR(S) : Espie et al.

Page 1 of 1

It is certified that error appears in the above-identified patent and that said Letters Patent is hereby corrected as shown below:

<u>Column 2,</u>
Line 53, "plug as" should read -- plug proposed as --
Line 54, "proposed" should be deleted Signed and Sealed this Twelfth Day of March, 2002

Attest:

Attesting Officer

JAMES E. ROGAN
Director of the United States Patent and Trademark Office